Oct. 17, 1972     G. MIDULLA     3,699,046
MOTION PICTURE SYSTEM
Filed Sept. 4, 1968
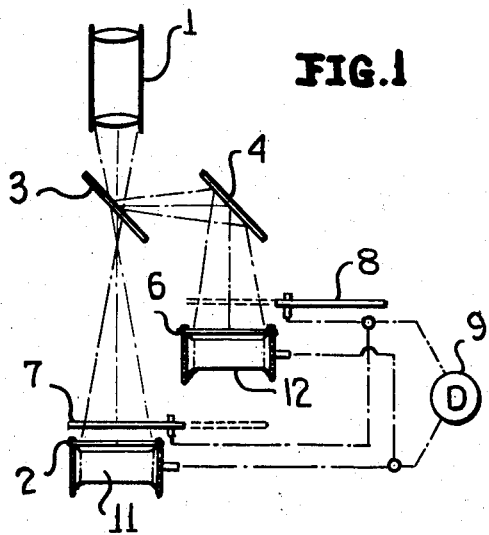
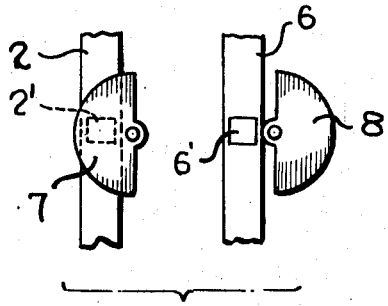
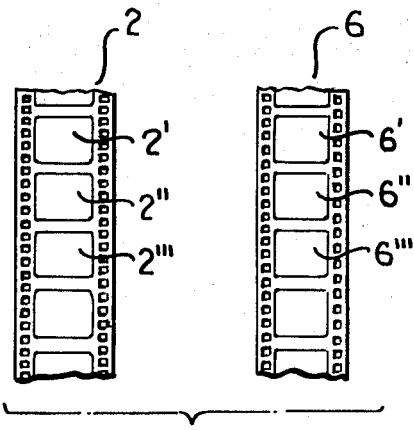
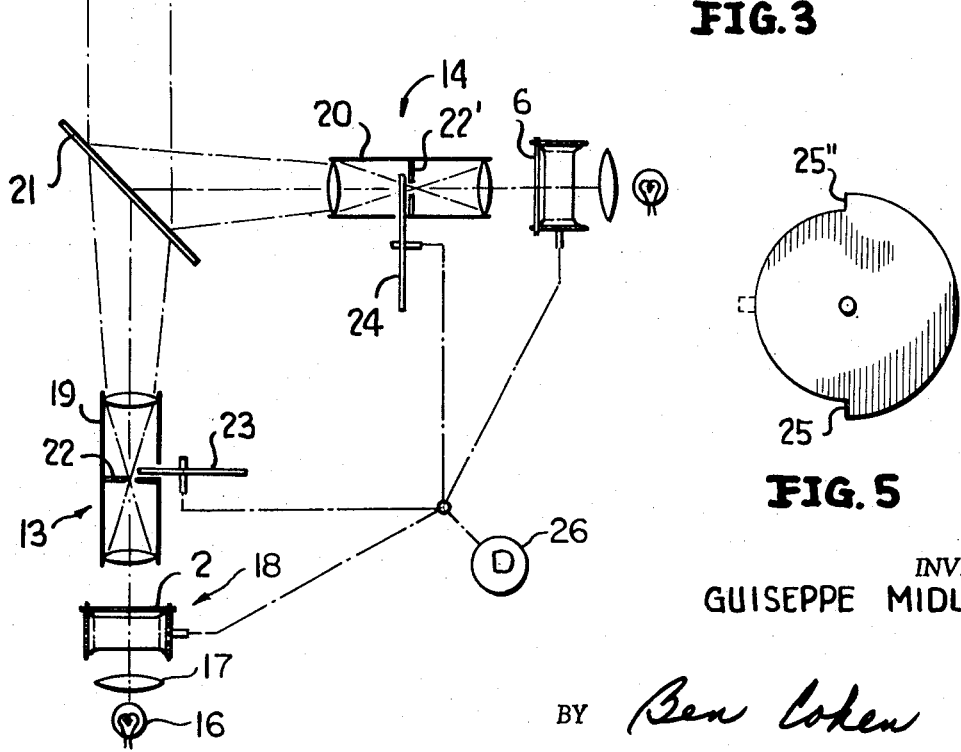
INVENTOR
GUISEPPE MIDULLA
BY Ben Cohen
ATTORNEY

3,699,046
MOTION PICTURE SYSTEM

Guiseppe Midulla, Tampa, Fla., assignor to Howard L. Rose, Potomac, Md., Elmer Moon, Atlanta, Ga., Roger Early, Brandon, Fla., and William C. Rubelsky, Ronald Leacock, William P. Rubelsky, Frank Perez, Jr., Arthur S. Gibbons, and Carlos B. McDaniel, all of Tampa, Fla., fractional part interest to each
Filed Sept. 4, 1968, Ser. No. 757,423
Int. Cl. G03b 21/40
U.S. Cl. 352—68                                  6 Claims

ABSTRACT OF THE DISCLOSURE

A motion picture taking and projection system employs two cameras and two projectors. The two cameras take pictures sequentially and successively in alternation with one camera taking a picture at all times. In the projection system the projectors operate sequentially and successively in alternation so that a projector is projecting an image on the screen at all times. The shutters, particularly of the projectors, are operative at the focal plane of the lens system of the projectors so that very rapid picture change-over is effected. The total system eliminates flicker due to rapid change-over strobe effects due to intermittent viewing of a main object and color changes due to black time on the screen. Further, a beam splitter is employed for filming and projecting whereby keystoning is eliminated and exact overlay of pictures is effected.

BACKGROUND OF THE INVENTION

Flicker in motion pictures is a problem that has been with the industry since its inception. Perceptible flicker has been eliminated, but the effect still persists and manifests itself in the form of eye fatigue of viewer.

In conventional systems perceptible flicker is eliminated by employing a frame rate of twenty-four frames per second with a double shutter. If a single shutter is employed, a frame rate of ninety-six frames per second is required to eliminate flicker. If no shutter is employed, frame rates of about one hundred-twenty frames per second are required, using a 60° shutter rather than a conventional 90° shutter.

None of the above systems will eliminate the imperceptible flicker effect of eye fatigue and only the twenty-four frames per second system is economically feasible so far as film usage is concerned. The black time, i.e., time no light is thrown on the screen in a twenty-four frame per second system is large and the black is added as a color-to-color film changing the total color effect of the film. In accordance with the present invention there is provided a motion picture taking and projecting system which eliminates flicker and black time for the screen and also eliminates the strobe effect of conventional picture systems. The system employs two cameras and two projectors. Each of the cameras is provided with a 180° shutter so that one camera takes a picture while the other camera is pulling its film down and then the functions of the two cameras are reversed. The shutters are synchronized so that the taking intervals for the two cameras do not overlap, the beginning of a taking interval for one camera coinciding exactly with the termination of the taking interval of the other camera. In view of this method of taking the picture, the camera system photographs an image at all times. Thus there can be no strobe effect resulting from taking of the picture.

In the projection part of the system, the two films are projected through a beam splitter or related type of mechanism, so that the two pictures are projected through a common lens onto a screen. Again 180° gate or shutter mechanisms are employed and synchronized so that a picture is on the screen at all times.

Two highly desirable results are derived from the above fact. First of all, colors are not distorted due to the introduction of black into the colors seen by the eye. Even more important, however, is the fact that the elimination of both perceptible and imperceptible flicker may now be achieved.

It has been determined that in a system with no black interval introduced into the viewing system flicker is eliminated if picture change-over is effected in $1/1500$ of a second. The threshold flicker elimination is at about $1/1350$ of a second and $1/1500$ is used as a margin of safety.

The required picture change-over time is easily effected in accordance with the present invention by causing the shutter to operate at the focal plane of the lens systems. For instance, if the circle of diffusion of the lens system of each projector is no greater than .015 inch and a five-inch circular shutter is employed in a fifteen frame per second projector, then the change-over time between projectors is $1/15,700$ of a second, a factor of ten less than the reasonably critical change-over period required.

Systems which are somewhat similar to that of the present invention have previously been suggested. A somewhat similar system is found in U.S. Pat. No. 2,745,312 to Sittig. In the Sittig patent, two films having pictures taken in alternation are projected through a single lens system to eliminate black time from the screen. The difficulties with the Sittig patent are the point at which the light beams are cut to provide gating and the overall gate structure employed. The gate structure also serves as an alternating mirror system to cause light from a single source to be diverted first through one film and then through the other film. Because of the arrangement employed, the Sittig patent has difficulty in two areas. In the first area the shutter is operative at other than the focal plane of the lenses. Thus the crossover time between the two projectors is considerably greater than the time required by the system of the present invention. Secondly, since the shutter forms part of the optical system and is quite large due to the overall geometry of the projectors and the shutter must operate at a very high rate to effect the necessary projector crossovers, wobble in the shutter cannot be eliminated. Such wobble is intolerable since under these circumstances the pictures from the two lens systems which are derived from the two film strips cannot be super-posed on the screen. If an almost perfect super-position is not effected, then the picture moves from side-to-side at the frame rate and introduces an effect even more objectionable than the flicker. Further, if an attempt is made to employ the Sittig apparatus for photographing a scene, the wobble in the shutter blurs one of the pictures while not affecting the other and the total effect is quite poor. This defect in the filming, as well as the aforementioned defects in the projection, produce an overall system that is not even remotely acceptable for commercial installations.

It is an object of the present invention to provide a motion picture taking and projection system which eliminates strobe effects, reduces if not substantially totally eliminates flicker and which does not introduce keystoning into the projection system, even though two projectors are employed.

It is another object of the present invention to eliminate flicker from a motion picture system, even though the system may be operated at one frame per second or less.

It is another object of the present invention to provide a motion picture system which during the picture taking process the subject being photographed is viewed at all times and which during the projection phase a picture is projected on the screen at all times and in which system the change-over between successive frames cannot be detected by the human eye.

It is another object of the present invention to provide a motion picture taking and projecting system which eliminates strobe effects, flickering and keystoning and increases picture brightness by eliminating black time on the screen and which system is wholly compatible with present motion picture projection schemes and television viewing systems.

DESCRIPTION OF THE PREFERRED EMBODIMENTS

Referring now specifically to FIG. 1 of the accompanying drawings, there is illustrated a motion picture taking system which may be employed with the apparatus of the present invention. In its simplest form, the apparatus comprises a condenser or viewing lens 1 for projecting an image onto a first film strip 2 through a beam splitter 3 arranged at an angle of 45° with the axis of the lens 1. The light passing through the condenser lens system 1, which does not pass through the beam splitter 3, is reflected at right angles to the axis of the lens system 1, to a mirror 4 arranged at 45° to the central axis of the light reflected by the beam splitter 3. The mirror 4 projects the reflected light onto a second film strip 6.

A shutter mechanism 7 is disposed between the beam splitter 3 and the film strip 2 and a second shutter mechanism 8 is disposed between the mirror 4 and the second film strip 6. The shutters 7 and 8 are driven by a conventional and common drive 9. The shutter 7, which is illustrated as rotating clockwise in FIG. 2, is in a position to commence termination of light to the film strip 2 which at the same time that the shutter 8, which is also rotating clockwise in FIG. 2, is commencing to permit light to pass to the film strip 6. The two shutters are 180° shutters so that once each half cycle of rotation their functions are reversed with the shutter 8 terminating the projection of light to the film strip 6, and the shutter 7 initiating the projection of light on the film strip 2.

Thus in the camera system of FIG. 1 the scene to be photographed is at all times being viewed by one or the other of the camera systems, or more specifically the image to be photographed is being projected onto one or the other of the film strips 2 and 6. The film strip 2 is advanced by a conventional film drive member 11 while the film strip 6 is advanced by a similar film drive member 12. As is conventional to motion picture cameras, each of the advanced mechanisms 11 and 12 of film drive mechanisms is operative when the light directed to its specific film is terminated. The film advance members 11 and 12 are also driven by the drive member 9 being synchronized with the operation of the shutters 7 and 8 to provide an overall taking and advancing system which is basically conventional in the art, except for the use of the two systems concurrently. Perhaps the best mechanism for effecting the drives is to use two completely conventional drives, except insofar as the gearing ratio on the shutters 7 and 8, and to employ timing belts to insure that each of the mechanisms is maintained in synchronism with each of the other mechanisms.

It should be noted that if additional lenses are not employed, the distance of the film 2 from the beam splitter 3 must be the same as the distance of the film 6 from the beam splitter 3, so that each of the films receives a real image from the lens system 1. Inasmuch as the light directed to the strip 6 is diverted to the mirror and thence from the mirror to the film, the forward to backward location of the film 6 to the lens is less than the distance of film 2 from the lens from the back distance of the film 2 from the lens 1, but the total optical distances are identical.

Referring now specifically to FIG. 3 of the accompanying drawings, there is illustrated the two film strips which may be exposed by the camera system of FIG. 1 of the present invention. It is assumed in the discussion that initially the left film strip which is generally designated by the reference numeral 2 is first exposed and that the strip 6 is the next strip to be exposed. The light which passes through the beam splitter 3 from the lens 1 is projected onto the first frame 2' of the strip 2, and at the end of a predetermined length of time, the shutter 7 cuts off the light to the strip 2 and the shutter 8 permits the light to fall on frame 6' of the film strip 6. Thus the first interval of viewing appears on frame 2–1 and the second interval of viewing appears on the frame 6'. The third view appears on the frame double 2" and the fourth view appears on the frame 6". In consequence the pictures alternate between the two film strips with one of the strips receiving an image at all times.

If the apparatus of the present invention, for instance, is to operate at fifteen frames per second for each machine, then each frame is exposed for about $\frac{1}{30}$ of a second. It is true that some blurring may be produced on the film; however, tests have shown that this blurring will not affect what is seen by the human eye. Specifically, pictures have been taken with this system at a greater rate, so that there was no blurring of moving images on the film, whereas at the thirty frames per second rate, there was blurring on the film. The pictures were then projected through the projector system to be described subsequently in conjunction with FIG. 4. It was found that the degree of blurring seen by the eye was the same regardless of whether there was blurring on the film or whether the image on the film was clear and sharp. It would appear that the eye sees a blurred or unblurred image due to the movement being viewed by the eye regardless of whether the film is blurred or not blurred and the system of the present invention is compatible with fast movement even though the exposure time may be as great as $\frac{1}{30}$ of a second.

Referring now specifically to the FIG. 4 of the accompanying drawings, there is illustrated a projector system which may be employed with the apparatus of the present invention. In the projector system there is provided a first optical system generally designated by the reference numeral 13, and a second projector optical system generally designated by the reference numeral 14. Specifically, the optical system 13 comprises a source of light 16, a condenser lens 17 for a light source 16, a film drive 18 and a projection lens system 19. The projection lens system 19 may be provided with an iris arrangement 22 which for purposes of discussion is taken to have an opening of approximately 0.015 inch in diameter and is located at the focal plane of the rear lens of the lens system 19. The lens system 19 projects a beam along an axis lying at 45° relative to a beam splitter 21, which receives light along a path lying at 45° thereto from the optical system 14.

The use of the beam splitter 21 permits the two optical systems to project along a common path from the projection apparatus to the screen and permits precise alignment of the picture elements of successive pictures so that there is no movement of the picture during the change-over from one projector to the other projector. Further, the beam splitter reflects, or projects a picture to the left of the beam splitter 21, as viewed in FIG. 1, and with appropriate lenses, an image may be projected on a small screen immediately adjacent the projectors so as to permit the operator while working in the booth to make precise adjustments at the machines without having to look out of the projection booth to the screen.

As indicated, the lens systems 19 is provided with an iris 22' located at the focal plane of the rear lens of lens systems 19. The lens system 20 is similarly provided with an aris 22'. The center opening of ecah of the irises 22 and 22' is no larger approximately than the circle of confusion of the lens system which in a good projector system is roughly 0.015 inch. Each of the optical systems 13 and 14 is provided with a 180° shutter 23 and 24, respectively. The shutters 23 and 24 are of the form illustrated in FIG. 5 and comprise a circular disk having the diameter of one-half the disk reduced relative to the other to provide gating shoulders 25 and 25''. Each of the disks extends through a slot formed in the lens systems 19 and 20, respectively, and the shoulders 25 and 25' are adapted to interrupt the light beam immediately upon emergence from the irises or aperture members 21 and 22.

The gates or shutters 23 and 24 block the beams of light in alternation in each of the lens system at a location where the beams are substantially no larger than their circle of confusion.

It is this specific location of the disks which permit the system to operate at low frame rates, but with no flicker. Specifically, if a five-inch diameter disk is employed which cuts the beam immediately adjacent the circle of confusion, which is accepted herein as being 0.015 inch, and if the framing rate is fifteen frames per second, then the change-over speed between one projector system and the other is approximately $1/15,700$ of a second, this being the time required for the shoulder 25 of the disk to travel a distance equivalent to the diameter of the circle of confusion.

As indicated previously, it is necessary to exceed a change-over time of $1/1500$ of a second to reduce flicker to an acceptable level. The present change-over speed is an order of magnitude faster than the required minimum and the flicker due to change-over is negligible if not non-existent.

The operation of the system of FIG. 4 is substantially the reverse of the camera system of FIG. 1. Specifically, the film strips 2 and 6 are projected onto a screen sequentially and successively and in alternation by means of the shutters 23 and 24. The shutters 23 and 24 are driven by a common motor 26 through either timing belts or a gear drive so that synchronism between the shutters is maintained at all times. As the shoulder, for instance, shoulder 25 of one of the shutters begins to block the light path in one of the projector systems, shoulder 25' of the shutter of the other projector is passing in front of its associated iris 22, so that as one picture is being wiped off of the screen the other picture is being put on the screen and continuous viewing is obtained.

It can be seen from the above description that the system of the present invention views an object to be photographed at all times and displays the object to be viewed at all times. Thus there is no strobe effect as the result of the intermittent photographing of a moving object. Further, flicker is reduced to a negligible factor if not completely eliminated due to the fact that there is a picture on the screen at all times (no dark time) in conjunction with the very rapid change-over between pictures as set forth immediately above. The system also permits exact alignment of the corresponding elements of successive pictures, since the projection paths of the two systems may be precisely aligned and thus the usual keystoning which is the result of projecting along two paths, or for that matter, photographing along two different paths, is not a factor in the present sysetm. Also due to the elimination of black time on the screen the pictures are brighter than in prior art devices and the addition of black to all of the colors is eliminated, resulting in truer colors on the viewing screen.

It should be noted that in a system employing, for instance, thirty frames per secondt here are fifteen frames per second taken by each camera. Each frame is exposed for approximately a thirtieth of a second and if rapid motion is being photographed, some blurring occurs. Tests with the equipment, however, have indicated that the blurring of the photographic image taken under these circumstances has no different effect upon the eye from blurring caused by direct viewing of such a rapidly moving object. Specifically, if the frame rate of the camera system is increased to the extent necessary to prevent blurring of the individual images on the film strips, when these film strips are projected with the apparatus FIG. 4, the eye sees blurring the same as if it were viewing the original scene. The amount of blurring observed under these circumstances so far as could be determined is the same as if the film, itself, had been blurred due to reduced framing rates. Thus rapid motion may be photographed even though the film is exposed for a length of time which may be greater than that required for correctional motion picture photography.

As indicated, the framing rates for each of the cameras may be fifteen frames per second and for a total of thirty frames per second viewing, which is compatible with television. However, if a film is being made which is not to be shown on television or in which compatibilty with television systems is not a factor, then a more conventional twenty-four frames per second may be employed wtih each camera photographing at a twelve frame per second rate.

Several factors are still to be considered. The film pull down time in the projectors may be as in conventional projectors. However, in order to extend film life, advantage may be taken of the 180° dark time for each projector. In the latter case, internal drives may be employed with the resultant lack of film bounce and excellent film positioning achieved by such feed mechanisms.

A further feature of the total system is that the projection frame rate may be slowed to almost any number desired so long as the change-over speed is maintained at approximately $1/1500$ second or greater. With the thirty-frame per second system described, frame rates of three frames per second may be shown before flicker becomes noticeable. If it is desired to project at still slower frame rates, then the machine may be built with a larger diameter shutter.

While I have described and illustrated one specific embodiment of my invention, it will be clear that variations of the details of construction which are specifically illustrated and described may be resorted to without departing from the true spirit and scope of the invention as defined in the appended claims.

I claim:

1. A method of taking and displaying motion pictures so as to eliminate stroboscopic effects, minimize flicker and maintain a picture on the viewing screen at all times, said method comprising the steps of holding two unexposed film strips in an image receiving position, directing the image of a scene to be photographed first to one film strip and then to the other film strip in alternation with the image of the scene being directed at all times to one or the other of the film strips and for equal increments of time, intermittently advancing the film strips in alternation, each being advanced when the image of the scene to be photographed is directed to the other film strip, subsequently displaying the motion picture thus taken by holding the exposed film strips in a position to have a collimated beam of light directed therethrough, intermittently advancing the film strips in alternation, each beam of light being focused on a display surface by being passed through a lens system producing initial convergence and subsequent divergence of the beam, directing the two focused beams of light along a common path, and interrupting the beams of light in alternation at the point of maximum convergence of the beams, the beams of light being interrupted for equal time intervals with a beam of light proceeding along the common path at all times.

2. A method of taking and displaying motion pictures so as to eliminate stroboscopic effects, minimize flicker and maintain a picture on the viewing screen at all times, said method comprising the steps of holding two unexposed film strips in an image receiving position, directing the image of a scene to be photographed first to one film strip and then to the other film strip in alternation with the image of the scene being directed at all times to one or the other of the film strips and for equal increments of time, intermittently advancing the film strips in alternation, each being advanced when the image of the scene to be photographed is directed to the other film strip, subsequently displaying the motion picture thus taken by holding the exposed film strips in a position to have a collimated beam of light directed therethrough, intermittently advancing the film strips in alternation, each beam of light being focused on a display surface by being passed through a lens system producing initial convergence and subsequent divergence of the beam, directing one of said beams through a beam splitter lying at 45° relative to the axis of the beam, directing the other of said beams at 45° relative to the beam splitter to be reflected thereby along the same path as the other beam, interrupting the beams of light in alternation at the point of maximum convergence of the beams, the beams of light being interrupted for equal time intervals with a beam of light proceeding along the common path at all times.

3. A motion picture projector comprising first and second film holding and intermittent film advancing mechanisms for intermittently moving each of two film strips past a different display location, means for forming collimated beams of light and directing each beam through a different film display location, means directing said beams of light after passing through said display locations along a common path and first and second means for interrupting said beams of light in alternation for equal time intervals such that a beam of light proceeds along said common path at all times, means for focusing said beams of light on a distant display surface, each said means for focusing comprising lens means for causing the rays of light of said beam to converge, said means for interrupting being disposed so as to interrupt the beams adjacent the location of maximum convergence of said beams; means for maintaining said means for interrupting and said means for advancing the film in isochronism whereby each means for advancing is operative only when the beam of light for displaying its associated film is blocked.

4. The combination according to claim 3 wherein the circle of confusion at the point of maximum convergence of said beams is approximately 0.015 inch, wherein said means for interrupting each comprises a rotating disc having a reduced diameter over 180° of its periphery, each said disc being disposed transverse to its associated beam of light and having an axis of rotation disposed a distance from the axis of said beam approximately equal to the diameter of the reduced region of the disc plus one-half the difference between the diameters of the two regions of the disc.

5. The combination according to claim 3 further comprising a beam splitter, means for directing said beams of light after passing through said display locations, along paths at 90° relative to one another, said beam splitter forming an angle of 45° with respect to the paths of both said beams.

6. The combination according to claim 3, wherein said means for interrupting each comprises a rotating disc having a reduced diameter over 180° of its periphery, each said disc being disposed transverse to its associated beam of light and having an axis of rotation disposed a distance from the axis of said beam approximately equal to the diameter of the reduced region of the disc plus one-half the difference between the diameters of the two regions of the disc.

References Cited

UNITED STATES PATENTS

| | | | |
|---|---|---|---|
| 2,460,350 | 2/1949 | Hinman | 352—133 |
| 2,745,312 | 5/1956 | Sittig | 352—68 |
| 3,035,484 | 5/1962 | Karavias | 352—68 |
| 3,271,097 | 9/1966 | De Montremy | 352—41 |
| 3,380,794 | 4/1968 | De Montremy | 352—68 |

LOUIS R. PRINCE, Primary Examiner

D. E. CORR, Assistant Examiner

U.S. Cl. X.R.

352—135